(12) United States Patent
Forsyth

(10) Patent No.: US 7,665,376 B2
(45) Date of Patent: *Feb. 23, 2010

(54) DUAL CLUTCH POWERSHIFT TRANSMISSION

(75) Inventor: John R. Forsyth, Romeo, MI (US)

(73) Assignee: Magna Powertrain USA, Inc., Troy, MI (US)

( * ) Notice: Subject to any disclaimer, the term of this patent is extended or adjusted under 35 U.S.C. 154(b) by 358 days.

This patent is subject to a terminal disclaimer.

(21) Appl. No.: 11/626,429

(22) Filed: Jan. 24, 2007

(65) Prior Publication Data

US 2007/0227282 A1 Oct. 4, 2007

Related U.S. Application Data

(60) Provisional application No. 60/744,035, filed on Mar. 31, 2006.

(51) Int. Cl.
*F16H 3/38* (2006.01)
*F16H 3/08* (2006.01)

(52) U.S. Cl. ............................ 74/330; 74/331; 74/340

(58) Field of Classification Search ................. 74/330, 74/331, 340
See application file for complete search history.

(56) References Cited

U.S. PATENT DOCUMENTS

| | | | | | |
|---|---|---|---|---|---|
| 2,208,153 | A | * | 7/1940 | Budlong | 74/337 |
| 4,244,232 | A | * | 1/1981 | Murayama | 74/15.66 |
| 4,461,188 | A | * | 7/1984 | Fisher | 74/330 |
| 4,548,101 | A | * | 10/1985 | Akashi et al. | 74/720 |
| 5,890,392 | A | | 4/1999 | Ludanek et al. | |
| 5,966,989 | A | | 10/1999 | Reed, Jr. et al. | |
| 6,427,549 | B1 | | 8/2002 | Bowen | |
| 6,428,438 | B1 | | 8/2002 | Bowen | |
| 6,460,425 | B1 | | 10/2002 | Bowen | |
| 6,499,370 | B2 | | 12/2002 | Bowen | |
| 6,575,866 | B2 | | 6/2003 | Bowen | |
| 6,655,488 | B2 | * | 12/2003 | Braud | 180/233 |
| 6,860,168 | B1 | | 3/2005 | Kobayashi | |
| 6,881,169 | B2 | | 4/2005 | Katakura | |
| 6,907,801 | B2 | | 6/2005 | Shimaguchi | |
| 6,958,028 | B2 | | 10/2005 | Janson et al. | |
| 6,966,860 | B2 | | 11/2005 | Heitmann et al. | |
| 6,969,335 | B2 | | 11/2005 | Lorken | |
| 7,044,014 | B2 | | 5/2006 | Janson et al. | |

(Continued)

FOREIGN PATENT DOCUMENTS

EP 0029711 A2 * 11/1980

*Primary Examiner*—Tisha D Lewis
(74) *Attorney, Agent, or Firm*—Harness, Dickey & Pierce, P.L.C.

(57) ABSTRACT

An automated dual-clutch multi-speed transmission is adapted to transfer power from an engine to the driveline of a motor vehicle. The transmission includes an output shaft adapted for connection to the driveline, an input shaft continuously driven by the engine and offset from a position substantially parallel to the output shaft. A countershaft is in constant driving engagement with the output shaft and is offset from and positioned substantially parallel to the input and output shafts. A first clutch is operable for establishing a releasable drive connection between the input shaft and a first driven shaft. A second clutch is operable for establishing a releasable drive connection between the input shaft and a second driven shaft. First and second gearset clutches are operable to releasably drivingly couple first and second gearsets to the countershaft.

22 Claims, 4 Drawing Sheets

U.S. PATENT DOCUMENTS

| | | | |
|---|---|---|---|
| 7,066,043 B2 * | 6/2006 | Kim et al. | 74/330 |
| 7,070,534 B2 | 7/2006 | Pelouch | |
| 7,073,407 B2 | 7/2006 | Stefina | |
| 7,077,025 B2 | 7/2006 | Janson et al. | |
| 7,082,850 B2 | 8/2006 | Hughes | |
| 7,083,540 B2 | 8/2006 | Janson et al. | |
| 7,114,409 B2 | 10/2006 | Eggert et al. | |
| 7,155,993 B2 | 1/2007 | Koenig et al. | |
| 7,287,443 B2 * | 10/2007 | Kuhstrebe et al. | 74/335 |
| 7,360,466 B2 * | 4/2008 | Seo | 74/331 |
| 7,421,919 B2 * | 9/2008 | Gumpoltsberger et al. | 74/330 |
| 7,500,411 B2 * | 3/2009 | Gumpoltsberger | 74/329 |

* cited by examiner

DUAL CLUTCH POWERSHIFT TRANSMISSION

CROSS REFERENCE

This application claims the benefit of U.S. Provisional Application Ser. No. 60/744,035 filed Mar. 31, 2006, the entire disclosure of which is incorporated by reference.

FIELD

The present disclosure relates to transmissions for use in motor vehicles and, more particularly, to a dual-clutch automated transmission applicable for use in motor vehicles.

BACKGROUND

Automobile manufacturers continuously strive to improve fuel efficiency. Efforts to improve fuel efficiency, however, are typically offset by the need to provide enhanced comfort and convenience to the vehicle operator. For example, it is well known that manual transmissions are more fuel efficient than automatic transmissions, yet a majority of all passenger vehicles are equipped with automatic transmissions due to the increased convenience they provide.

More recently, "automated" variants of conventional manual transmissions have been developed which shift automatically without any input from the vehicle operator. Such automated transmissions typically include a plurality of power-operated actuators that are controlled by a transmission controller to shift traditional synchronized dog clutches. However, such automated transmissions have the disadvantage that there is a power interruption in the drive connection between the input shaft and the output shaft during sequential gear shifting. Power interrupted shifting may result in a harsh shift feel which is generally considered to be unacceptable when compared to the smooth shift feel associated with most automatic transmissions. To overcome this problem, automated twin-clutch transmissions have been developed which can be powershifted to permit gearshifts to be made under load. Examples of such automated manual transmissions are shown in U.S. Pat. Nos. 5,966,989 and 5,890,392. While such powershift twin-clutch transmissions overcome several drawbacks associated with conventional single-clutch automated transmissions, a need exists to develop simpler and more robust transmissions which advance the automotive transmission technology.

In particular, it may be advantageous to position the clutches at opposite ends of the transmission to provide maximized cooling. Additionally, by positioning the clutches in this manner, each clutch assembly may be appropriately sized without the requirement that the shift clutch be packaged within the start clutch. Furthermore, depending on the location of the output shaft of the transmission, it may be possible to provide drive torque to front and rear propeller shafts without the use of a separate transfer case.

SUMMARY

Accordingly, the present disclosure provides a dual-clutch transmission and a control system for permitting automatic shifting of the dual-clutch transmission.

In accordance with the present invention, an automated dual-clutch multi-speed transmission is adapted to transfer power from the engine to the driveline of a motor vehicle. The transmission includes an output shaft adapted for connection to the driveline, an input shaft continuously driven by the engine and which is offset from and positioned substantially parallel to the output shaft. A countershaft is in constant driving engagement with the output shaft and is offset from and positioned substantially parallel to the output shaft and the input shaft. A first clutch is operable for establishing a releasable drive connection between the input shaft and a first shaft. A second clutch is operable for establishing a releasable drive connection between the input shaft and a second shaft. A first constant mesh gearset is driven by the first shaft. A second constant mesh gearset is driven by the second shaft. A first gearset clutch is operable to releasably drivingly couple the first gearset to the countershaft. A second gearset clutch is operable to releasably drivingly couple the second gearset to the countershaft.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
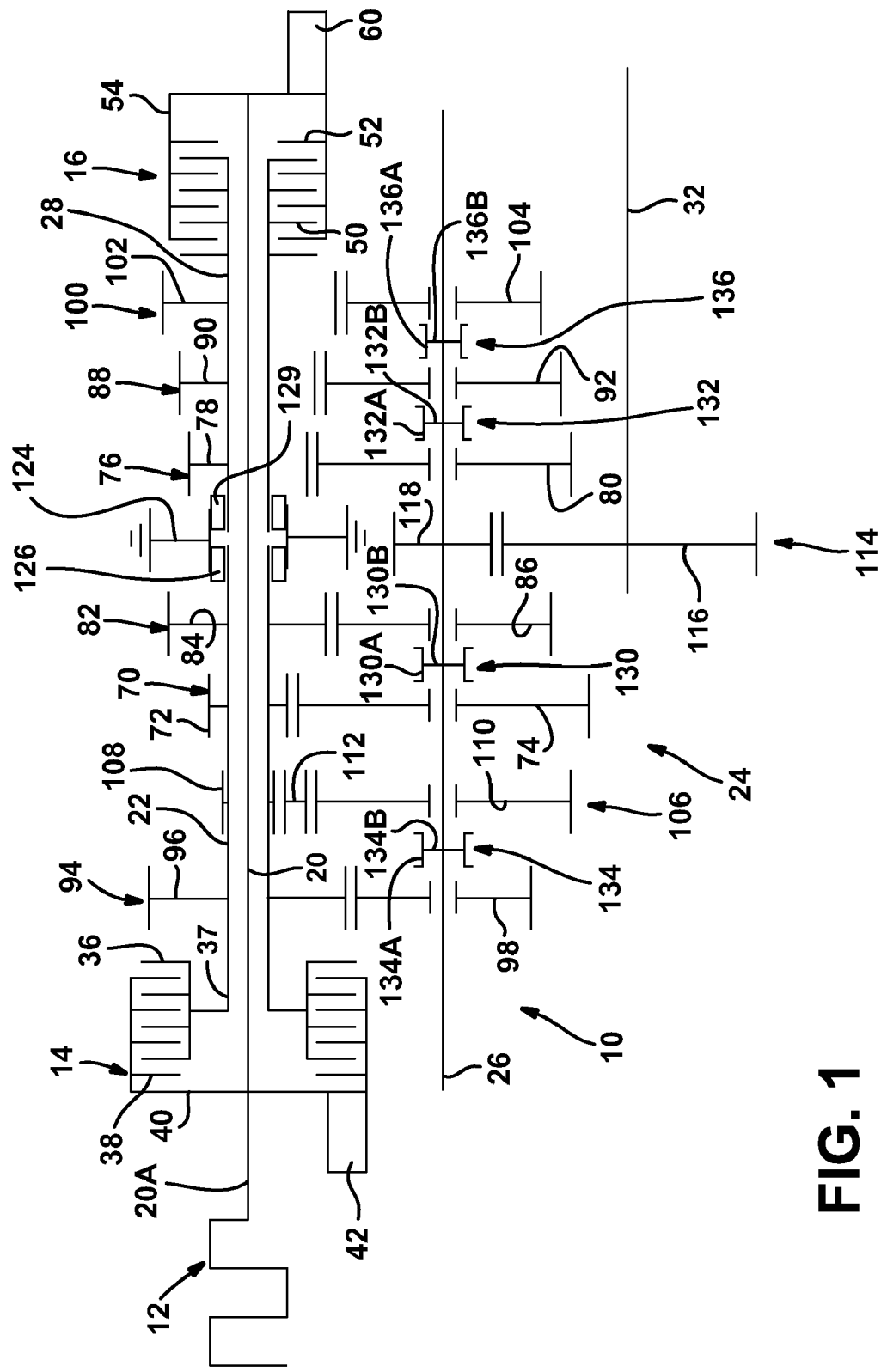
FIG. 1 is a schematic view of a dual-clutch automated transmission according to the present invention.

The following description is merely exemplary in nature and is not intended to limit the present disclosure, application, or uses. It should be understood that throughout the drawings, corresponding reference numerals indicate like or corresponding parts and features.

Figure 2:
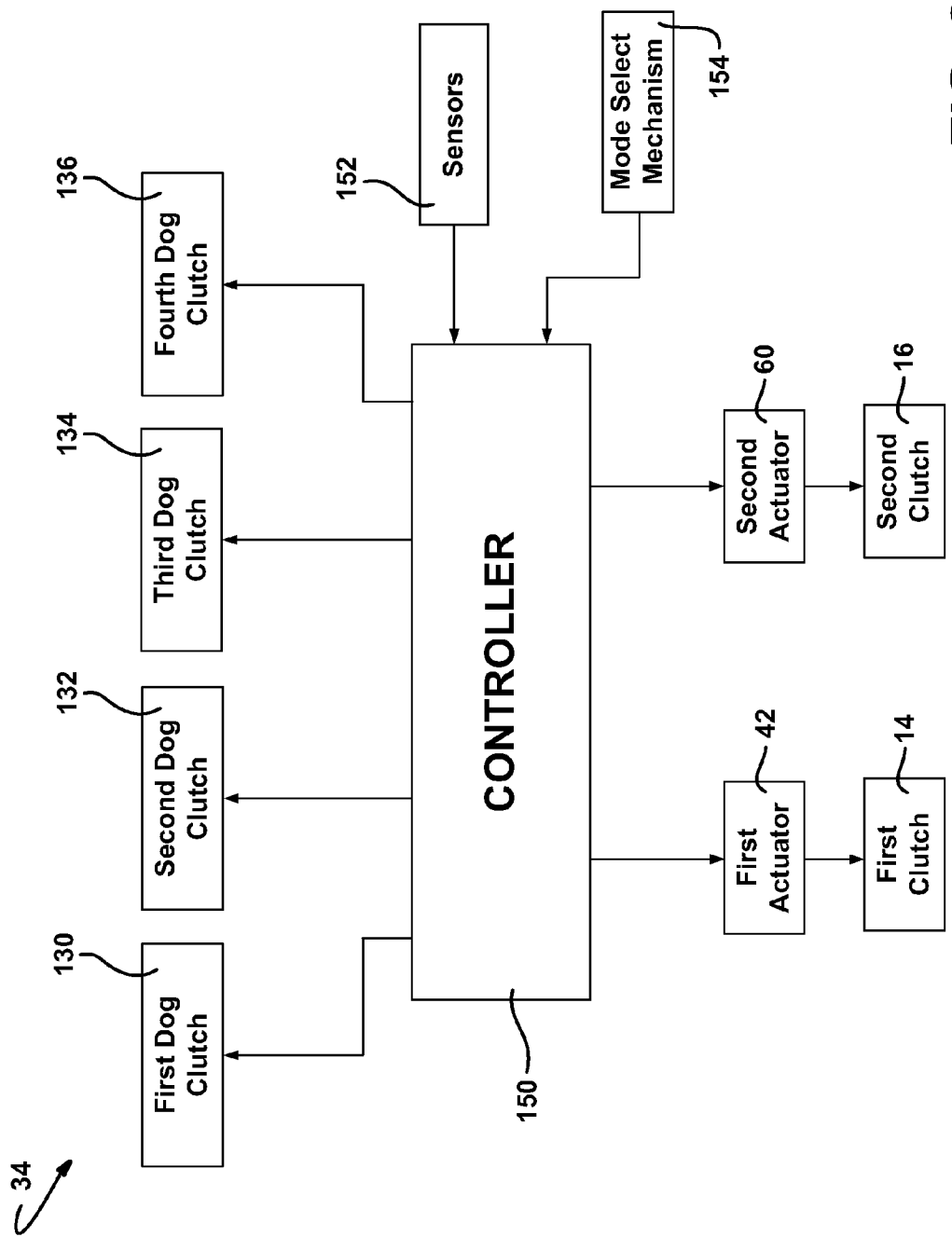
FIG. 2 is a diagrammatic illustration of a transmission control system adapted for use with the dual-clutch automated transmission shown in FIG. 1.
Figure 3:
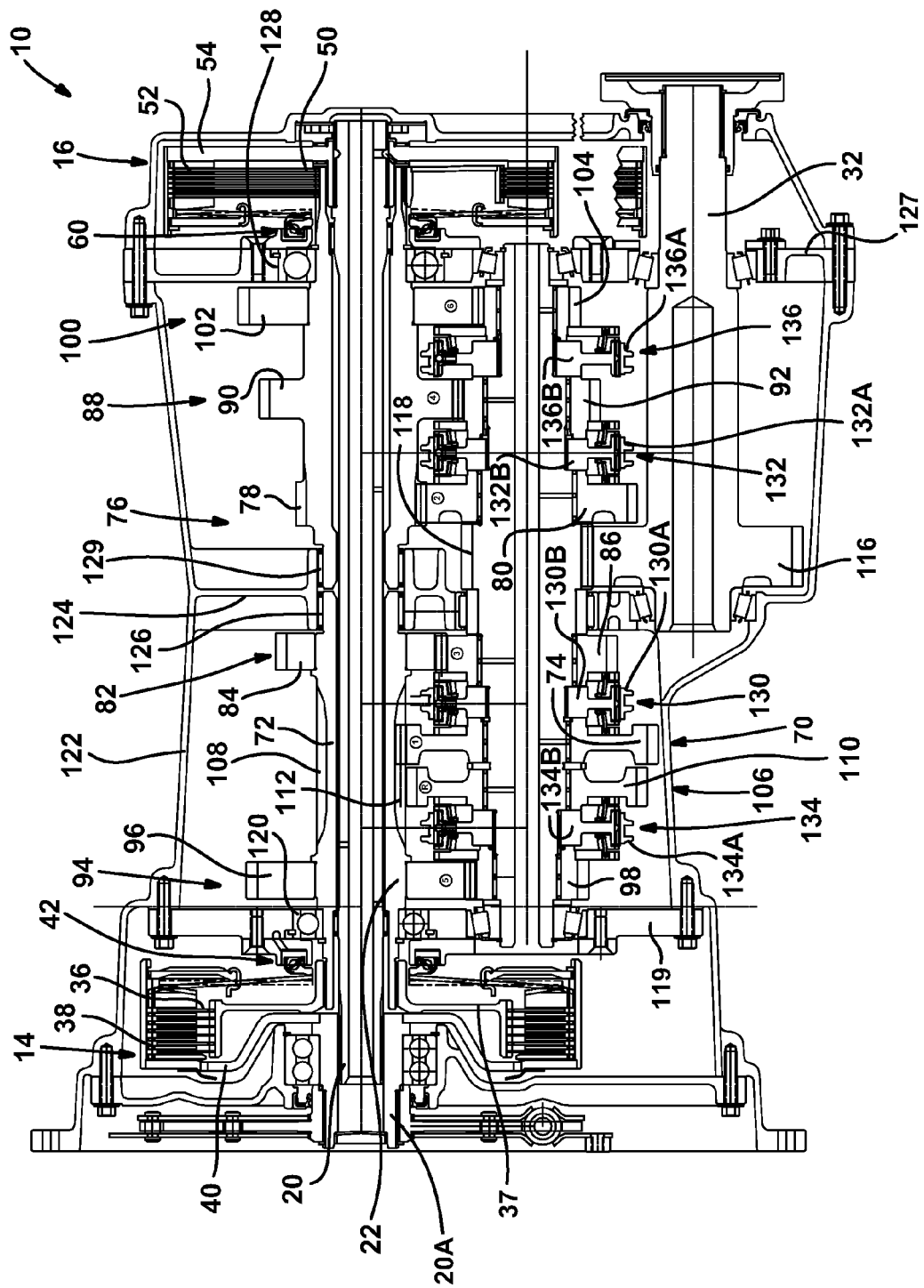
FIG. 3 is a cross-sectional view of the dual-clutch automated transmission shown in FIG. 1.

With reference to FIGS. 1-3 of the accompanying drawings, a dual-clutch automated transmission, hereinafter referred to as transmission 10, will now be described. Transmission 10 is driven by the output of an engine 12 and generally includes a first clutch 14, a second clutch 16, an input shaft 20, a first tubular shaft 22, a geartrain defined by a plurality of output gearsets 24, a countershaft 26, a second tubular shaft 28, an output shaft 32, and a shift control system 34. As seen, first shaft 22 and second shaft 28 surround input shaft 20 for rotation about a common rotary axis.

First clutch 14 is a multi-plate clutch having a plurality of inner clutch plates 36 splined to a clutch hub 37 that is fixed for rotation with first tubular shaft 22. A plurality of outer clutch plates 38 are splined to a clutch housing 40 that is fixed to a stub shaft segment 20A of input shaft 20. First clutch 14 is normally operable in an engaged or closed state to establish a drive connection between input shaft 20 and first tubular shaft 22. A first power-operated actuator 42 is provided to apply a force to cause inner clutch plates 36 and outer clutch plates 38 to separate from one another and cease the transfer of torque through first clutch 14. In the embodiment shown, first actuator 42 is shown as a hydraulically-actuated device that controls the magnitude of torque transferred through first clutch 14. As noted, first actuator 42 may also fully release first clutch 14 so no torque is transferred therethrough.

Second clutch 16 includes a plurality of inner clutch plates 50 in splined engagement with second tubular shaft 28 and a plurality of outer clutch plates 52 in splined engagement with a clutch housing 54. Housing 54 is fixed to input shaft 20 at an end opposite engine 12. Second clutch 16 is also a normally closed clutch that transmits torque when not acted upon by an external force. In the closed condition, inner clutch plates 50 frictionally engage outer clutch plates 52 and torque is transferred between engine output 12 and second tubular shaft 28. Inner clutch plates 50 and outer clutch plates 52 are axially moveable to positions spaced apart from one another where second clutch 16 does not transfer torque. A second power-operated actuator 60 is operable to control actuation of second clutch 16 to selectively transfer a predetermined quantity of torque between input shaft 20 and second tubular shaft 28 or fully release the clutch plates from one another. While it is shown that first actuator 42 and second actuator 60 are hydraulically operated devices, it is understood that other types of power-operated actuators including electrically-powered actuators are within the scope of the present disclosure.

The plurality of constant mesh output gearsets 24 includes a first gearset 70 having a first drive gear 72 fixed to first tubular shaft 22 which is meshed with a first speed gear 74 rotatably supported on countershaft 26. A second gearset 76 includes a second drive gear 78 fixed to second tubular shaft 28 which is in meshed engagement with a second speed gear 80 rotatably supported on countershaft 26. A third gearset 82 includes a third drive gear 84 fixed to first tubular shaft 22 which is in meshed engagement with a third speed gear 86 rotatably supported on countershaft 26. A fourth gearset 88 includes a fourth drive gear 90 fixed to second tubular shaft 28 which is in meshed engagement with a fourth speed gear 92 rotatably supported on countershaft 26. A fifth gearset 94 includes a fifth drive gear 96 fixed to first tubular shaft 22 which is in meshed engagement with a fifth speed gear 98 rotatably supported on countershaft 26. A sixth gearset 100 includes a sixth drive gear 102 fixed to second tubular shaft 28 which is in meshed engagement with a sixth speed gear 104 rotatably supported on countershaft 26. A reverse gearset 106 includes a reverse drive gear 108 fixed to first tubular shaft 22, a reverse speed gear 110 rotatably supported on countershaft 26 and a reverse idler gear 112 which is in meshed engagement with reverse drive gear 108 and reverse speed gear 110. An output gearset 114 includes a first output gear 116 fixed to output shaft 32 that is meshed with a second output gear 118 fixed to countershaft 26.

To provide a robust, compact package, one end of first tubular shaft 22 is concentrically supported in a front bearing bulkhead 119 by a bearing 120 (FIG. 3). A transmission case 122 includes a center web 124 rotatably supporting the other end of first tubular shaft 22 with a bearing 126. Similarly, second tubular shaft 28 is supported at one end by a bearing 128 in a rear bearing bulkhead 127 and by a bearing 129 and center web 124 at the other end.

Shift control system 34 includes a plurality of electrically-actuated dog clutches which are operable for selectively coupling a selected speed gear to countershaft 26 for establishing the six forward and one reverse speed ratio drive connections. These electrically-actuated dog clutches include a first dog clutch 130 operable for selectively coupling/releasing first speed gear 74 and third speed gear 86 to/from countershaft 26. A second dog clutch 132 is operable for selectively coupling/releasing second speed gear 80 and fourth speed gear 92 to/from countershaft 26. A third dog clutch 134 is operable for selectively coupling/releasing fifth speed gear 98 and reverse speed gear 110 to/from countershaft 26. A fourth dog clutch 136 is operable for selectively coupling/releasing sixth speed gear 104 to/from countershaft 26. Each dog clutch includes a sliding sleeve (denoted by the suffix "A") which is splined for rotation with and axial movement on a clutch hub (denoted by the suffix "B") which, in turn, is fixed to countershaft 26. As is conventional, bi-directional axial movement of the sliding sleeves from neutral, central uncoupled positions shown results in clutched engagement with the adjacent speed gear.

Each dog clutch may be electrically powered to control axial movement of the shift sleeves. It is to be understood that any other type of power-operated device capable of moving each sliding sleeve between its uncoupled and coupled positions is within the scope of this disclosure. FIG. 3 depicts synchronizers in place of the electrically-actuated dog clutches. The synchronizers are identified with like numerals having a suffix with a "prime" designation.

As best shown in FIG. 2, shift control system 34 includes a controller 150 which receives various sensor input signals, denoted diagrammatically by block 152. Transmission controller 150 is an electronically-controlled unit capable of receiving data from the vehicle sensors and generating output signals in response to the sensor input signals. The input signals delivered to controller 150 can include, without limitation, engine speed, throttle position, brake status, input shaft speed, tubular shaft speeds, countershaft speed, and output shaft speed. Controller 150 is operable to coordinate and monitor actuation of all the electrically-controlled devices associated with shift control system 34, so as to permit power shifted sequential gear changes automatically without any input from the vehicle operator. As such, transmission 10 is capable of being smoothly shifted automatically without power interruption.

If desired, a manually-operable mode selector switch 154 can be provided to shift transmission 10 from its automatic shift mode to a manual shift mode. Mode switch 154 would, when actuated, allow the vehicle operator to manipulate shift devices (i.e., paddles, switches, etc.) or the shift lever to effect sequential gear shifts without the use of a clutch pedal. However, controller 150 would only permit the selective gear shift to be completed if the current vehicle characteristics (i.e., engine speed, vehicle speed, etc.) permit completion of the requested shift.

To operate the vehicle, engine 12 is started with the gear shift lever in its PARK position. Each of first clutch 14 and second clutch 16 are in the normally engaged state with their respective drive connections completed. However, each of the electrically-actuated dog clutches are released with each shift sleeve located in its neutral uncoupled position such that no drive torque is delivered to countershaft 26. When the vehicle operator moves the gear shift lever from the PARK position to the DRIVE position, first actuator 42 is operated to place first clutch 14 in the open state. First dog clutch 130 is actuated to drivingly interconnect first speed gear 74 and countershaft 26. First actuator 42 is controlled to allow normally closed first clutch 14 to transfer torque from input shaft 20 through first tubular shaft 22, first drive gear 72, first speed gear 74, countershaft 26, second output gear 118, first output gear 116 to output shaft 32 so as to establish the first forward speed ratio drive connection between the input shaft 20 and the output shaft 32. First clutch 14 is gradually engaged to smoothly accelerate the vehicle.

Thereafter, when the vehicle operating parameters indicate a need to shift into the second forward gear ratio, controller 150 outputs a signal controlling second actuator 60 to place second clutch 16 in an open condition thereby drivingly disconnecting input shaft 20 and second tubular shaft 28. Second dog clutch 132 is energized to cause sliding sleeve 132A to engage second speed gear 80 thereby drivingly coupling second speed gear 80 with countershaft 26. Controller 150 then coordinates the release of first clutch 14 and the re-engagement of second clutch 16. As such, torque is transferred from input shaft 20, through second clutch 16, second tubular shaft 28, second drive gear 78, second speed gear 80, countershaft 26, second output gear 118, first output gear 116 to output shaft 32 so as to establish the second forward speed ratio drive connection. Once first clutch 14 is released completely, controller 150 causes first dog clutch 130 to return sliding sleeve 138 to its neutral position for uncoupling first speed gear 74 from countershaft 26. The power supply to first actuator 42 may be discontinued to allow first clutch 14 to operate in its normally closed state. At this time, transmission 10 is operable in an energy conservation mode.

If controller 150 determines that transmission 10 will be operated in a certain drive gear for a predetermined amount of time, each of the dog clutches associated with the speed gears not currently transferring torque are moved to their normally centered position. Furthermore, the plate clutch that is not transferring torque is allowed to return to its normally closed position. At this time, energy is not required to be provided to either of first actuator 42 or second actuator 60. When transmission 10 is in the energy conservation mode as previously described, the transmission operates very similarly to a manual transmission instead of a typical automatic transmission. Typical automatic transmissions require energy to be continuously supplied to cause the interleaved plates of the clutch packs to be forced into contact with one another and transfer torque. The normally closed clutches of transmission 10 alleviate the need for a supply of hydraulic pressure or electrical energy to transfer torque at a predetermined gear ratio. It should be appreciated that transmission 10 may be operable in the energy conservation mode when operating within any one of the speed ratios.

To automatically establish the third forward gear ratio, first actuator 42 causes inner clutch plates 36 to become disengaged from outer clutch plates 38 such that torque is no longer transferred between input shaft 20 and first tubular shaft 22. First dog clutch 130 is controlled to drivingly couple third speed gear 86 and countershaft 26. A clutch-to-clutch 2-3 power shift occurs as controller 150 controls first and second actuators 42, 60 to disengage second clutch 16 while first clutch 14 is being engaged.

Figure 4:
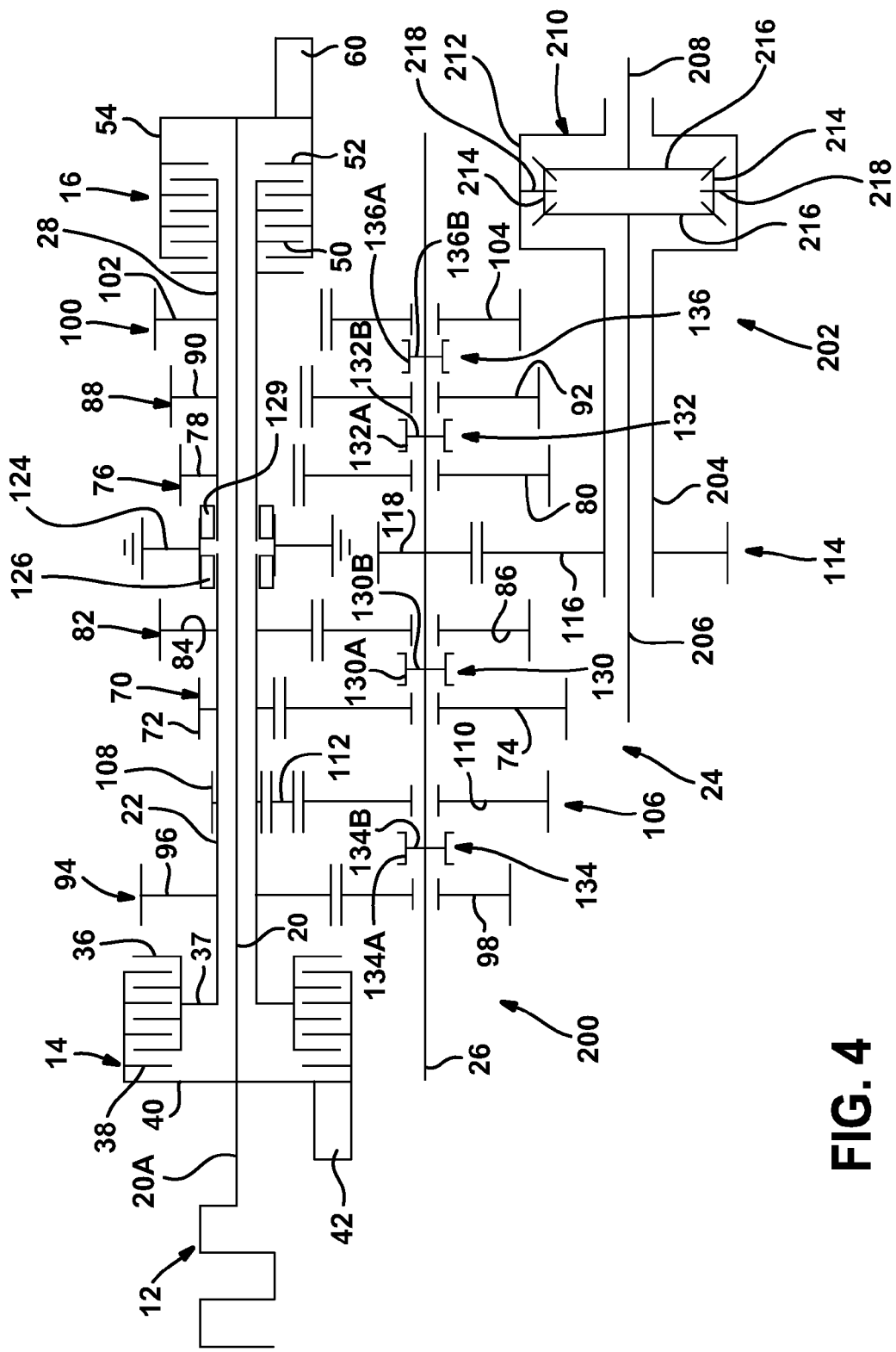
FIG. 4 is a schematic view of an alternate embodiment dual-clutch automated transmission operable to provide output torque to front and rear output shafts.

FIG. 4 depicts an alternate embodiment dual-clutch multi-speed transmission 200. Transmission 200 is substantially similar to transmission 10 except that output shaft 32 has been replaced by an output drive arrangement 202. Output drive arrangement 202 is operable to provide output torque to a first set of driven wheels (not shown) as well as output torque to a second set of driven wheels (not shown) so as to establish a four-wheel drive arrangement without the need for a separate transfer case type device. It is also contemplated to employ transmission 200 in a front-wheel drive vehicle with its outputs driving a pair of front wheels. Like components of transmissions 10 and 200 will retain their previously introduced reference numerals.

Output drive arrangement 202 includes a third tubular shaft 204 having first output gear 116 fixed thereto, a first or front output shaft 206, a second or rear output shaft 208 and a differential assembly 210. Differential assembly 210 includes a housing 212 fixed to third tubular shaft 204 and pinion gears 214 rotatably supported by housing 212. Pinion gears 214 are positioned in meshed engagement with side gears 216 and rotatably driven by pinion pins 218 fixed to differential housing 212. One of side gears 216 is fixed to front output shaft 206 while the other side gear 216 is fixed to rear output shaft 208.

From the following description, it should be apparent that transmission 10 provides an energy efficient assembly where sequential shifts may be pre-selected thereby requiring only clutch-to-clutch switching to effect a shift. Benefits include smoother, quicker sequential shifts. Depending on the number of forward and reverse gear ratios desired, various combinations of clutches and gearsets may be configured even though not explicitly depicted in the drawings. Furthermore, the spaced apart positioning of the first and second clutches assists in cooling the clutches. The offset output shaft facilitates power supply to front and rear drivelines. These and other variations disclose and describe merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A dual-clutch transmission for use in a motor vehicle having an engine and a driveline, comprising:
    an output shaft adapted for connection to the driveline;
    an input shaft continuously driven by the engine, the input shaft offset from and positioned substantially parallel to the output shaft;
    a countershaft in constant driving engagement with the output shaft, the countershaft offset from and positioned substantially parallel to the output shaft and the input shaft;
    a first clutch operable for establishing a releasable drive connection between the input shaft and a first driven shaft;
    a second clutch operable for establishing a releasable drive connection between the input shaft and a second driven shaft;
    first, third, fifth and reverse constant mesh gearsets driven by the first driven shaft;
    second, fourth and sixth constant mesh gearsets driven by the second driven shaft; and
    first, second, third and fourth gearset clutches, the first gearset clutch operable to releasably drivingly couple the first and third gearsets and the countershaft, the second gearset clutch operable to releasably drivingly couple the second and fourth gearsets and the countershaft, the third gearset clutch operable to releaseably drivingly couple the fifth and reverse gearsets and the countershaft, and the fourth gearset clutch operable to releaseably drivingly couple the sixth gearset and the countershaft.

2. The dual-clutch transmission of claim 1 further including a controller for controlling actuation of the first and second clutches.

3. The dual-clutch transmission of claim 2 further including first and second actuators controlling the first and second clutches, respectively, the controller controlling actuation of the first and second actuators.

4. The dual-clutch transmission of claim 3 wherein the first and second gearset clutches are electrically-actuated dog clutches.

5. A dual-clutch transmission for use in a motor vehicle having an engine and a driveline, comprising:
    an output shaft adapted for connection to the driveline;

an input shaft continuously driven by the engine, the input shaft being offset from and positioned substantially parallel to the output shaft;
a countershaft in constant driving engagement with the output shaft, the countershaft being offset from and positioned substantially parallel to the output shaft and the input shaft;
a first clutch operable for establishing a releasable drive connection between the input shaft and a first driven shaft;
a second clutch operable for establishing a releasable drive connection between the input shaft and a second driven shaft;
a first constant mesh gearset being driven by the first driven shaft;
a second constant mesh gearset being driven by the second driven shaft; and
first and second gearset clutches, the first gearset clutch being operable to releasably drivingly couple the first gearset and the countershaft, the second gearset clutch being operable to releasably drivingly couple the second gearset and the countershaft, wherein the first driven shaft and the second driven shaft concentrically encompass a portion of the input shaft, and wherein the first and second driven shafts each have a first end portion rotatably supported by a web portion of a housing.

6. The dual-clutch transmission of claim 5 wherein a second end portion of the first driven shaft is coupled by the first clutch to the input shaft and a second end portion of the second driven shaft is coupled by the second clutch to the input shaft.

7. A dual-clutch transmission for use in a motor vehicle having an engine and a driveline, comprising:
an output shaft adapted for connection to the driveline;
an input shaft continuously driven by the engine, the input shaft being offset from and positioned substantially parallel to the output shaft;
a countershaft in constant driving engagement with the output shaft, the countershaft being offset from and positioned substantially parallel to the output shaft and the input shaft;
a first clutch operable for establishing a releasable drive connection between the input shaft and a first driven shaft;
a second clutch operable for establishing a releasable drive connection between the input shaft and a second driven shaft;
a first constant mesh gearset being driven by the first driven shaft;
a second constant mesh gearset being driven by the second driven shaft; and
first and second gearset clutches, the first gearset clutch being operable to releasably drivingly couple the first gearset and the countershaft, the second gearset clutch being operable to releasably drivingly couple the second gearset and the countershaft, wherein the first clutch is positioned at one end of the input shaft and the second clutch is positioned at an opposite end of the input shaft.

8. The dual-clutch transmission of claim 7 wherein the first and second clutches are normally closed clutches operable to transmit torque without an application of external force.

9. The dual-clutch transmission of claim 7 wherein the output shaft has a first end adapted to provide torque to a first set of driven wheels and a second end adapted to provide torque to a second set of driven wheels.

10. The dual-clutch transmission of claim 7 further including a differential in constant driving engagement with the countershaft, the differential providing torque to the output shaft and another shaft adapted for connection with another driveline.

11. A dual-clutch transmission for use in a motor vehicle having an engine and a driveline, comprising:
an input shaft continuously driven by the engine;
an output shaft adapted for connection to the driveline and having a first output gear fixed thereto;
a countershaft having a second output gear fixed thereto in meshed engagement with the first output gear;
a first clutch positioned at one end of the input shaft and operable for establishing a releasable drive connection between the input shaft and a first substantially tubular shaft having a first drive gear, a third drive gear and a fifth drive gear fixed thereto, the first tubular shaft concentrically encompassing a portion of the input shaft;
a second clutch positioned at an opposite end of the input shaft and operable for establishing a releasable drive connection between the input shaft and a second substantially tubular shaft, the second tubular shaft concentrically encompassing a portion of the input shaft and having a second drive gear, a fourth drive gear and a sixth drive gear fixed thereto;
first, second, third, fourth, fifth and sixth speed gears rotatably supported on the countershaft, each of the first through sixth speed gears being in meshed engagement with the corresponding one of the first through sixth drive gears; and
first and second speed gear clutches, the first speed gear clutch being operable to releasably drivingly couple the first speed gear and the countershaft, the second speed gear clutch being operable to releasably drivingly couple the second speed gear and the countershaft.

12. The dual-clutch transmission of claim 11 further including a controller for controlling actuation of the first and second clutches.

13. The dual-clutch transmission of claim 12 further including first and second actuators controlling the first and second clutches, respectively, the controller controlling actuation of the first and second actuators.

14. The dual-clutch transmission of claim 11 wherein the first and second substantially tubular shafts have ends supported by a center web of a housing rotatably supporting the output shaft.

15. The dual-clutch transmission of claim 14 wherein the output shaft, the input shaft and the countershaft each extend along spaced apart parallel axes.

16. The dual-clutch transmission of claim 11 wherein the first and second clutches are normally closed clutches operable to transmit torque without an application of external force.

17. A dual-clutch transmission for use in a motor vehicle having an engine, a front driveline, and a rear driveline, the transmission comprising:
a first output shaft adapted for connection to the front driveline;
a second output shaft adapted for connection to the rear driveline;
an input shaft driven by the engine, the input shaft being offset from and positioned substantially parallel to the first and second output shafts;
a countershaft in constant driving engagement with the first and second output shafts;
a first clutch operable for establishing a releasable drive connection between the input shaft and a first driven shaft;

a second clutch operable for establishing a releasable drive connection between the input shaft and a second driven shaft;

a first constant mesh gearset driven by the first driven shaft;

a second constant mesh gearset driven by the second driven shaft;

first and second gearset clutches, the first gearset clutch being operable to releasably drivingly couple the first gearset and the countershaft, the second gearset clutch being operable to releasably drivingly couple the second gearset and the countershaft; and a differential having a case driven by the countershaft, a first side gear being fixed to the first output shaft and a second side gear being fixed to the second output shaft, wherein the case is coupled to a third tubular shaft concentrically encompassing a portion of one of the first and second output shafts.

18. The dual-clutch transmission of claim 17 further comprising a third constant mesh gearset being driven by the first driven shaft and a fourth constant mesh gearset being driven by the second driven shaft.

19. The dual-clutch transmission of claim 18 wherein the first gearset clutch is operable to releasably drivingly couple the third gearset and the countershaft, the second gearset clutch being operable to releasably drivingly couple the fourth gearset and the countershaft.

20. A dual-clutch transmission for use in a motor vehicle having an engine and a driveline, comprising:

an input shaft continuously driven by the engine;

an output shaft adapted for connection to the driveline and having a first output gear fixed thereto;

a countershaft having a second output gear fixed thereto in meshed engagement with the first output gear;

a first clutch operable for establishing a releasable drive connection between the input shaft and a first substantially tubular shaft having a first drive gear, a third drive gear and a fifth drive gear fixed thereto, the first tubular shaft concentrically encompassing a portion of the input shaft;

a second clutch operable for establishing a releasable drive connection between the input shaft and a second substantially tubular shaft, the second tubular shaft concentrically encompassing a portion of the input shaft and having a second drive gear, a fourth drive gear and a sixth drive gear fixed thereto;

first, second, third, fourth, fifth and sixth speed gears rotatably supported on the countershaft, each of the first through sixth speed gears being in meshed engagement with the corresponding one of the first through sixth drive gears;

first and second speed gear clutches, the first speed gear clutch being operable to releasably drivingly couple the first speed gear and the countershaft, the second speed gear clutch being operable to releasably drivingly couple the second speed gear and the countershaft; and a housing having a center web rotatably supporting an end portion of the first and second substantially tubular shafts.

21. The dual-clutch transmission of claim 20 wherein the output shaft, the input shaft and the countershaft each extend along spaced apart parallel axes.

22. The dual-clutch transmission of claim 20 wherein the first clutch is positioned at one end of the input shaft and the second clutch is positioned at an opposite end of the input shaft.

* * * * *